United States Patent Office 2,908,587
Patented Oct. 13, 1959

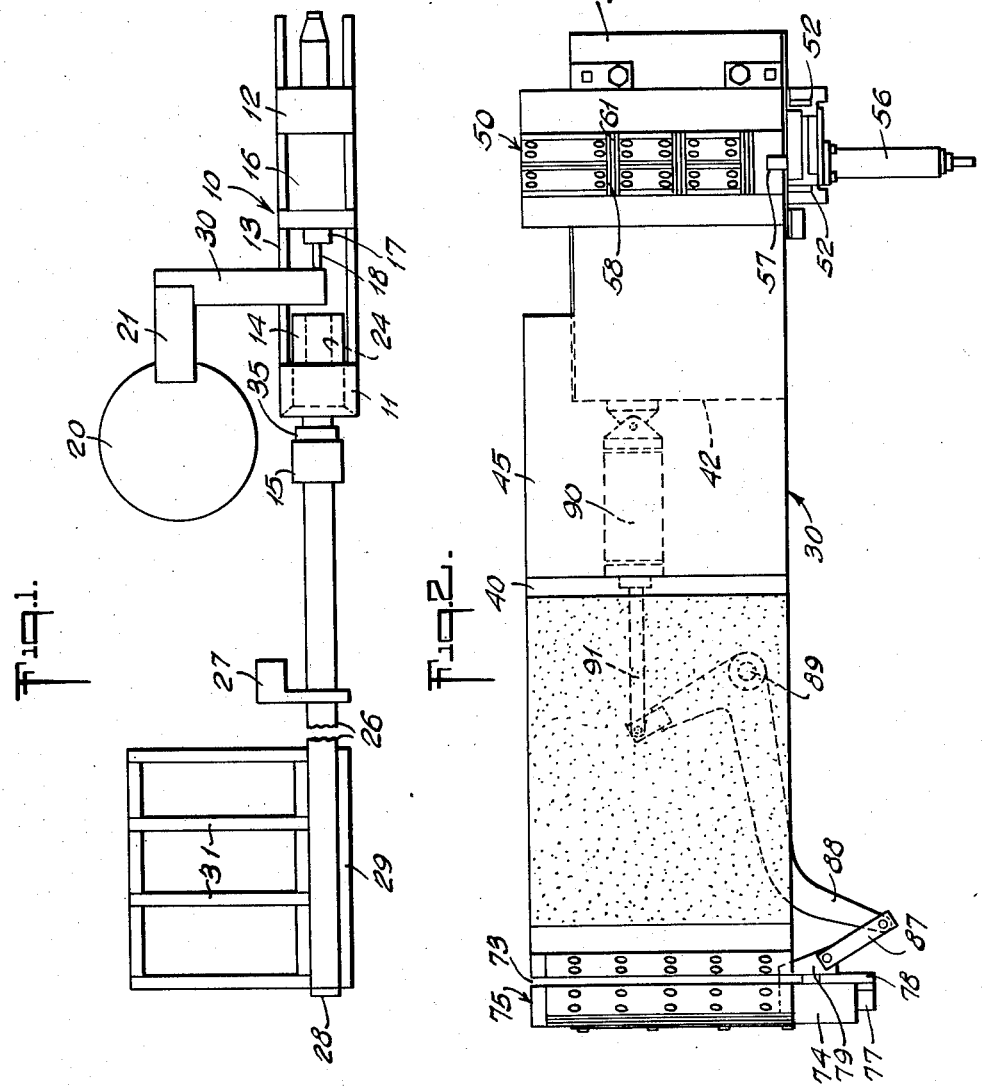

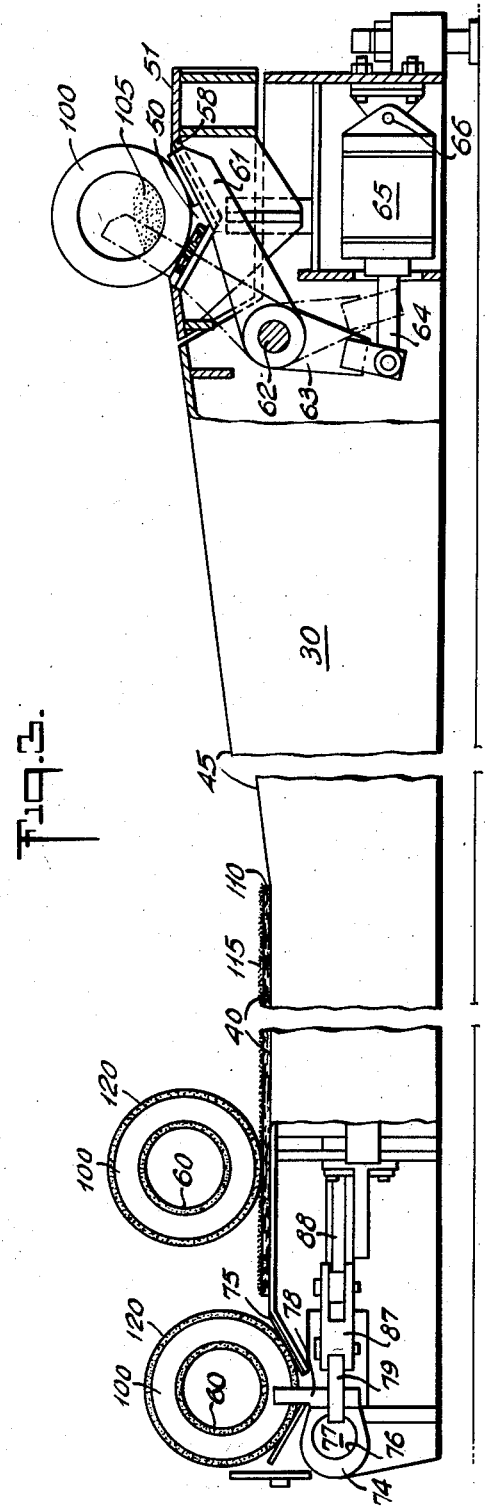

2,908,587

METHOD OF COATING A CYLINDRICAL METAL ELEMENT

Sidley O. Evans, Beaver Falls, and William R. Walker, New Brighton, Pa., assignors to The Babcock & Wilcox Company, New York, N.Y., a corporation of New Jersey Application April 12, 1954, Serial No. 422,312

2 Claims. (Cl. 117—23)

This invention relates to a novel method of applying a pulverized refractory lubricant to the outer surface of an extrusion billet and to novel apparatus useful in practicing such method.

In the formation of metal shapes by extrusion, a block or billet of metal at an elevated temperature is forced under high pressure to flow through a die having an opening corresponding to the desired cross-sectional shape of the extrusion to be produced. The temperature of the metal may be 2300° F., in the case of steel, by way of example.

To form a tubular extrusion, the billet is usually pierced before insertion in the extrusion press and, before ram pressure is applied to the billet, a mandrel is projected coaxially through the billet and die. When pressure is applied to the billet, the billet metal flows through the die around the mandrel, so that a tube is extruded having dimensions determined by the die and the mandrel. In effect, the die opening and mandrel cooperate to form an annular extrusion orifice.

In a typical extrusion press, front and rear platens are held in accurately spaced relation with each other. Between the platens is mounted a billet container for movement toward and away from the forward platen. The rear platen supports a ram arranged to project into the container and force a billet therein to flow through the die. The latter is mounted in a die holder releasably engaged in a die carrier aligned with the container passage. This carrier is mounted for movement into and out of the forward platen to move the die into and out of operative relation with the exit or downstream end of the container. A mandrel is coaxially telescoped in the ram for projection through a pierced billet and into the die for tubular extrusions.

When an extrusion is to be made, the container is moved forwardly to seat against the rear face of the forward platen. A die holder and die assembly is meanwhile mounted on the rear face of the carrier and the latter is moved rearwardly into the forward platen to engage the die in a recess in the forward end of the container and coaxial with the container passage. The carrier is then locked to the forward platen. After a heated billet has been loaded into the container, the mandrel is projected through the billet and into the die. The ram, carrying a dummy block on its outer end, is then moved forwardly under very high pressure to force the billet outwardly through the die over the mandrel. The extrusion is then severed and conveyed away from the press.

The formation of metal shape by extrusion has been successfully applied to non-ferrous metals for some time. However, it is only recently that plain and alloy steels have been extruded using glass as a lubricant. This has been due to the relative difficulties and problems involved in the extrusion of steels and alloys as compared to the difficulties and problems of extruding non-ferrous metals such as aluminum, brass and copper. For example, the use of lubricants having a carbon base for the extrusion of some alloy steels may require an excessive amount of refinishing of the extruded shape due to the carbon pickup in the hot metal. These extra finishing operations have prevented the extrusion process from attaining a competitive position with respect to other metal working processes.

This picture has been changed radically by the introduction of a new steel extrusion process in which relatively refractory materials, such as glass, have been used as lubricants. These refractory materials have the advantage that they do not contain any significant amounts of carbon as a constituent element, coupled with a further advantage that the glass has the property of melting in successive layers or films as it is contacted by the hot metal. Thus, only the surface or contacting layer of the glass is initially melted as the billet moves therealong, and as this film is destroyed, successive underlying layers or films are melted sequentially, thus providing a continuous lubricant film between the extrusion and the die through which the extrusion is being forced under very high pressures.

In the aforementioned typical extrusion press, plugs of glass fiber or similar material are placed in the container passage before the billet is loaded into the container. Charging of the billet into the container pushes these plugs up against the upstream or entry surface of the die. In addition, a layer of glass lubricant is applied to the external surface of the hot billet as the latter is being fed to the extrusion press. This may be effected by wrapping a sheet of glass fiber around the billet surface as the heated billet rolls over a transfer surface toward the press, or by rolling the hot billet over a bed of powdered glass.

The glass lubricant may be applied to the surface of the billet passage by depositing a measured quantity of particulate glass in the passage before the billet rolls over the transfer surface. As the billet rolls along toward the press, this glass is distributed over and adheres to the hot metal of the surface of the passage, forming a uniform depth layer of glass thereon. This method of lubricating the billet passage, and the apparatus for effecting it, form the subject matter of the copending application of A. B. Capron et al., Serial No. 413,766, filed March 3, 1954.

In accordance with the present invention, it has been found that the nature of the surface over which the billet rolls to pick up particulate glass to form the lubricating layer on the external surface of the billet is important for proper formation of this layer. The surface should be soft enough to deflect to make the glass conform to the billet surface. The glass must stick to the billet surface and soften sufficiently to flow thereover to form a uniform layer on the surface. The adherence and softening of the glass are effected by the heat of the billet. Consequently, the surface on which the particulate glass is distributed should be of a nature such as not to absorb heat from the billet.

With these considerations in view, it has been found that the best results are secured when the particulate glass is spread on a yieldable heat resistant surface. An effective surface of this type is a sheet or blanket of asbestos, although other equivalent materials may be used.

For an understanding of the invention principles, reference is made to the following description of a typical embodiment thereof as illustrated in the accompanying drawings.

In the drawings:

Fig. 1 is a schematic plan view of an extrusion press and associated billet and extrusion handling and processing components;

Fig. 2 is a plan view of transfer means for conveying a billet from a billet heating means to the extrusion press; and Fig. 3 is a side elevation view of the transfer means illustrating a billet in successive positions therealong.

Referring to Fig. 1, an extrusion press 10 is illustrated as including a front platen 11, a rear platen 12 rigidly tied to platen 11 by tie rods such as 13, a container 14 having limited longitudinal movement relative to the platens, a die carrier 15 movable into and out of front platen 11, and a ram assembly 16 having a ram 17 projectable into container 14. A mandrel 18 is movably mounted coaxially within ram 17.

As described in the copending application of Sidley O. Evans, Serial No. 328,688, filed December 30, 1952, now Patent No. 2,739,799, issued March 27, 1956, billets intended for the extrusion of tubular products are preferably initially heated to a piercing temperature and then pierced to have an inner diameter somewhat larger than that of the extruded tubular products. The initial heating means, the piercing press, and associated conveyors, and handling devices have not been shown in detail as they form no part of the present invention.

The pierced billets are then heated to a high temperature, such as 2300° F. in the case of steel, in a preferably rotary heating means 20. The billets are charged into heating means 20 and extracted therefrom by suitable billet handling device 21. This device deposits the heated billets onto a transfer means 30 which transfers the billets into alignment with passage 24 of container 14 and ejects them into this passage.

Mandrel 18 is first extended through the billet passage and through a die 35 mounted on the rear face of carrier 15 and held thereby against the exit end of container passage 24, carrier 15 being locked into forward platen 11 and thus held against movement relative to the two platens 11 and 12. Ram 17 is then projected into passage 24 to engage the billet and force it, under high pressure, to flow through die 35 around mandrel 18, thus forming a tubular extrusion. Mandrel 18 is withdrawn into ram 17 at the end of the extrusion stroke, and ram 17 and mandrel 18 are then conjointly withdrawn and container 14 moved rearwardly a short distance away from front platen 11. This pulls the extrusion backwardly a short distance through die 35, leaving a short section of the extrusion exposed between container 14 and die 35. This short section is then severed, as by a saw cut, and container 14 is moved forwardly so that the part of the extrusion, or discard, fixed to the container acts as a ram to push the remainder of the extrusion through die 35. The extruded element is then withdrawn by runout table and conveyor 26. Container 14 is again withdrawn from platen 11 and ram 17 is then moved into container 14 to eject the severed end, or discard, of the extrusion, this discard falling into a suitable receptacle.

Meanwhile, conveyor 26 moves the extrusion forwardly beneath a saw 27. The latter severs the extrusion into the required handling lengths and the cut sections are moved forwardly against a stop 28. At this point, a pusher 29 moves the sections laterally from conveyor 26 onto skids 31 for storage or further handling.

Before the billet, such as 100, is charged into the passage 24 of container 14, one or more cylindrical plugs of glass fiber are placed in the passage 24 so that loading of the billet thereinto will result in the plugs being interposed between the billet and the rear or upstream face of the die assembly. The die assembly is shown and described more particularly in the copending application of David A. Edgecombe, Serial No. 334,211, filed January 30, 1953, for "Die Changing Arrangement for Metal Working Apparatus," now Patent No. 2,731,123, issued January 17, 1956. Also, and as has been briefly mentioned heretofore, the billet has a layer of glass lubricant applied to its external surface as it moves along transfer means 30 to the extrusion press.

Referring to Figs. 2 and 3, the transfer means 30 is provided, adjacent its end remote from the extrusion press, with a sloping surface or ramp 45 leading into a substantially level platform 40. Billet 100 is delivered from heating means 20, by a billet handling device 21 which may be of the type shown and described in the above mentioned copending application of Sidley O. Evans, Serial No. 328,688, filed December 3, 1952, for "Charge-Discharge Mechanism for Billet Heating Means," now Patent No. 2,739,799 issued March 27, 1956. As described more particularly in such Evans application, device 21 is a drum shaped elevator carrying on its periphery a trough arranged to receive a metal "basket" in which is a highly heated billet.

In the unloading position of means 21, this trough is aligned with a trough 50 formed in the upper surface of a platform or table 51 pivotal on trunnions 52 on a shaft extending longitudinally of means 30. Trough 50 may thus be swung up into alignment with the trough on means 21 to receive a billet, and then lowered to hold the billet axis parallel with transfer means 30.

Extending from the hinged end of platform 51 is a shock absorber means 56 having a plunger 57 extending into trough 50 in substantial central alignment therewith. As the billet is ejected into trough 50, the plunger 57 acts as a cushioning means for the billet.

By reference to Fig. 2, it will be noted that trough 50 is formed with transverse slots 58. As the trough reaches its horizontal position, fingers 61, secured to a transverse shaft 62, enter slots 58 to lie slightly beneath the billet supporting surface of the trough 50. A crank arm 63, secured to shaft 62, is connected to a piston rod 64 of a pressure fluid actuator 65 pivotally connected at 66 to the framework of means 30. With the trough in the horizontal position, actuator 65 can be operated to cause fingers 61 to be swung counter-clockwise moving billet 100 out of the trough to roll down the ramp 45.

As described in the above mentioned copending application, Serial No. 413,766, solid glass, in the form of powdered glass, is deposited along the axial passage of the heated billet while the latter is in trough 50. The amount of solid glass so applied is selected in accordance with the billet temperature, composition, length, and inner diameter to provide a lubricant film, on the surface of the axial passage, having the required depth for effective lubrication of mandrel 18 and the billet passage. An elongated pile of particulate glass 105 is shown in the axial passage of billet 100.

Actuator 65 is then energized to cause fingers 61 to swing counter-clockwise to eject the billet from trough 50 to roll down surface 45 and over surface 40. The solid glass in direct contact with the hot metal is melted by contact therewith and sticks to the surface of the passage. As the billet rolls over the surface of transfer means 30, the pile of glass is tumbled so that additional glass is brought into direct contact with other portions of the hot metal of the billet passage to melt and stick thereto. In this manner, the powdered glass is uniformly distributed over the surface of the billet passage to form a uniform depth glass layer, this layer being indicated at 60.

In accordance with the present invention, a novel method and novel apparatus are used to apply a film of glass lubricant to the external surface of billet 100 as it rolls over the surface of transfer means 30. Referring to Figs. 2 and 3, a blanket or sheet 110 of yieldable heat-resistant material, such as asbestos or similar material, is placed on the surface of platform 40. Particulate glass 115 is spread over sheet 110 before billet 100 rolls over the surface of transfer means 30.

As the billet rolls over the particulate glass on sheet 110, the sheet yields under the weight of the billet bringing the glass into conforming engagement with the external surface of the billet. The glass sticks to the hot surface of the billet, whenever the latter comes in contact with the glass, and softens to flow over the surface to form a uniform depth glass layer 120 thereon. The softening and flowing of the glass is facilitated by the action of heat-resistant cushion or sheet 110 which maintains the heat in the billet rather than extracting heat therefrom. The heat thus retained in billet 100 by the insulating effect of blanket or sheet 110 has the incidental result that the billet, when charged into the press, is somewhat hotter than it would be otherwise.

At the end of the surface of platform 40 nearest the extrusion press, the billet rolls into the container charge device or billet ejector 75. Referring again to Figs. 2 and 3, this ejector comprises a V-shaped trough having a slot 73 along its apex. The wall of the V furthest from platform surface 40 has secured therewith a guide 74 having a laterally opening key shaped slot 76 receiving a correspondingly shaped rib 77 formed on an ejector bar 78. Ejector bar 78 is thus guided to move along slot 73.

In its surface opposite to rib 77, bar 78 has projecting therefrom an ear 79 connected by a link 87 to one end of a crank 88 pivoted on an axis 89 to swing parallel to the surface of platform 40. The other end of crank 88 is connected to the piston 91 of a pressure fluid actuator 90 pivoted to a cross brace 42 of the transfer means framework. Actuator 90 is operated, when device 75 is aligned with container passage 24, to swing crank 88 to move bar 78 along slot 73 in device 75 to charge the billet into the container passage.

While device 75 is shown fixed to the surface of platform 40 for illustrative purposes, in actual practice it may be mounted on the free end of a pivoted section of transfer means 30 so as to be swingably out of the path of movement of the extrusion press parts. The details of any such construction form no part of the present invention. Also, the trough 50 may be made movable longitudinally relative to transfer means 30 between the illustrated position and a receiving and tilted position adjacent means 21. Asbestos sheet 110 may be placed either on flat platform 40 or on sloping platform 45.

The apparatus for distributing the granular material over the heat-resistant mat forms the subject matter of the copending application of David A. Edgecombe and Sidley O. Evans, Serial No. 451,892, filed August 24, 1954, now Patent No. 2,803,215, issued August 20, 1957.

While a specific embodiment of the invention has been shown and described in detail to illustrate the application of the invention principles, it will be understood that the invention may be embodied otherwise without departing from such principles.

What is claimed is:
1. The method of coating a relatively heavy cylindrical metal element while heated to a high temperature with a layer of glass-like material having a relatively wide range of melting temperature below but approaching the temperature to which the cylindrical element is heated, comprising the steps of: spreading a substantially continuous layer of such glass-like material in loose particulate form on a fixed sheet of yieldable heat resistant material disposed on a sationary surface over an area of said surface having a length which is longer than the circumference of the cylindrical element and a width at least equal to the length of the cylindrical element; and rolling the heated cylindrical element over the layer of loose particulate material to pick up loose particulate material from the sheet onto the external circumferential surface of the heated cylindrical element; the yieldability of the sheet tending to effect arcuate contact of between the layer of material and the cylindrical element during its travel thereover, the length of the layer of material being coordinated with the temperature of the cylindrical element so that the initial coating of particulate material is melted sufficiently to pick up additional particulate material to build up the thickness of the coating to the desired value; and the length of travel of the cylindrical element being sufficient to melt the picked up material to a substantially continuous uniform viscous layer on the circumferential surface of the cylindrical element.

2. The method of coating a relatively heavy cylindrical metal element as claimed in claim 1 in which the fixed sheet of yieldable heat resistant material is a sheet of yieldable asbestos.

References Cited in the file of this patent

UNITED STATES PATENTS

| | | |
|---|---|---|
| 416,077 | Robertson | Nov. 26, 1889 |
| 862,285 | Schmidt | Aug. 6, 1907 |
| 1,160,804 | Wolfer et al. | Nov. 16, 1915 |
| 1,433,561 | McRoberts | Oct. 31, 1922 |
| 1,508,865 | Williams | Sept. 16, 1924 |
| 1,561,957 | Towne | Nov. 17, 1925 |
| 2,430,083 | Sherman | Nov. 4, 1947 |
| 2,538,917 | Sejournet et al. | Jan. 23, 1951 |
| 2,630,220 | Sejournet et al. | Mar. 3, 1953 |
| 2,706,850 | Sejournet et al. | Apr. 26, 1955 |
| 2,731,123 | Edgecombe | Jan. 17, 1956 |
| 2,738,062 | Edgecombe | Mar. 13, 1956 |
| 2,739,799 | Evans | Mar. 27, 1956 |
| 2,810,478 | Sejournet et al. | Oct. 22, 1957 |

FOREIGN PATENTS

| | | |
|---|---|---|
| 11,439 | Great Britain | 1912 |
| 699,120 | Great Britain | Oct. 28, 1953 |
| 731,321 | Great Britain | June 8, 1955 |